US005952418A

United States Patent [19]

Romes et al.

[11] Patent Number: 5,952,418
[45] Date of Patent: Sep. 14, 1999

[54] FIBERGLASS/DRY ADHESIVE MIXTURE AND METHOD OF APPLYING SAME IN A UNIFORM MANNER

[75] Inventors: Gary E. Romes, Cincinnati, Ohio; Mark H. Vagedes, Warrenville, Ill.; Joseph T. Church, Memphis, Tenn.; Charles Chenoweth, Coldwater, Mich.

[73] Assignee: Guardian Fiberglass, Inc., Albion, Mich.

[21] Appl. No.: 08/942,914

[22] Filed: Oct. 2, 1997

Related U.S. Application Data

[60] Continuation-in-part of application No. 08/668,477, Jun. 25, 1996, abandoned, which is a division of application No. 08/589,620, Jan. 22, 1996, Pat. No. 5,666,780, which is a continuation-in-part of application No. 08/572,626, Dec. 14, 1995, Pat. No. 5,641,368.

[51] Int. Cl.$^6$ .............................. C08K 3/40; C04B 14/42

[52] U.S. Cl. .......................... 524/494; 524/493; 524/557; 524/564; 106/711

[58] Field of Search .................................... 524/494, 557, 524/564; 106/711

[56] References Cited

U.S. PATENT DOCUMENTS

| | | | |
|---|---|---|---|
| 1,888,841 | 11/1932 | Wenzel et al. | 52/404.3 |
| 2,989,790 | 6/1961 | Brown | 52/742.13 |
| 3,619,437 | 11/1971 | McDonald, Jr. | 264/46.6 |
| 4,177,618 | 12/1979 | Felter | 52/105 |
| 4,468,336 | 8/1984 | Smith | 252/62 |
| 4,487,365 | 12/1984 | Sperber | 239/8 |
| 4,673,594 | 6/1987 | Smith | 427/196 |
| 4,710,309 | 12/1987 | Miller | 252/62 |
| 4,712,347 | 12/1987 | Sperber | 52/404.1 |
| 4,741,777 | 5/1988 | Williams et al. . | |
| 4,768,710 | 9/1988 | Sperber | 239/8 |
| 4,773,960 | 9/1988 | Vincelli et al. | 156/357 |
| 4,804,695 | 2/1989 | Horton | 524/27 |
| 4,822,679 | 4/1989 | Cerdan-Diaz et al. | 428/392 |
| 5,085,897 | 2/1992 | Luckanuck | 427/421 |
| 5,118,751 | 6/1992 | Schulze et al. | 524/503 |
| 5,131,590 | 7/1992 | Sperber | 239/8 |
| 5,155,964 | 10/1992 | Fortin et al. | 52/742.13 |
| 5,171,802 | 12/1992 | Salazar | 526/225 |
| 5,287,674 | 2/1994 | Sperber | 52/742.13 |
| 5,389,167 | 2/1995 | Sperber | 156/71 |
| 5,393,794 | 2/1995 | Sperber | 521/78 |
| 5,421,922 | 6/1995 | Sperber | 156/71 |
| 5,426,163 | 6/1995 | Buehler et al. | 526/207 |
| 5,536,784 | 7/1996 | Mao et al. | 525/154 |

OTHER PUBLICATIONS

Certaspray® Fiberglass Spray Insulation Manual/Brochure, 1982, Including Job Report and pp. 1–39.

Certaspray® Fiber Glass Spray Insulation Specification Sheet, 1982.

ASFI American Sprayed Fibers, Inc., Fireproofing and Acoustical Products.

Cafco Sound–Shield Application and Installation Manual.

Cafco Blaze–Shield and Blaze–Shield II Application and Installation Manual.

Sun–System and Sun–Guard II Sprayed Insulation by Suncoast Insulation Mfg. Co.

Perfect Fit™ Fiberglass Insulation.

The New Generation of Wall Insulation R–PRO Plus Wall System.

Suncoast Insulation, S. A. B. System™ Light Density Cafco 400 Sprayed Fire Protection.

"Spray–On Energy Seal", Energy Wise/Energy Seal, 1990.

"Colorado Conference Statement".

*Primary Examiner*—Tae Yoon
*Attorney, Agent, or Firm*—Hall, Priddy & Myers

[57] ABSTRACT

A loose-fill insulation product is provided which includes a dry mixture of loose-fill fiberglass and an inorganic adhesive in the form of a redispersible powder. During application, the dry loose-fill mixture is coated with a liquid (e.g. water) so as to activate the adhesive. Thereafter, the loose-fill mixture with activated adhesive is blown or sprayed into a cavity (open or closed) so as to insulate same.

4 Claims, 1 Drawing Sheet

FIBERGLASS/DRY ADHESIVE MIXTURE AND METHOD OF APPLYING SAME IN A UNIFORM MANNER

This is a continuation of application Ser. No. 08/668,477, filed on Jun. 25, 1996, now abandoned: which is a Div. of 08/589,620, filed Jan. 22, 1996 (now U.S. Pat. No. 5,666,780) which is a CIP of 08/572,626, filed Dec. 14, 1995 (now U.S. Pat. No. 5,641,368) which are incorporated by reference herein.

This invention relates to a loose-fill fiberglass/dry adhesive mixture and a method of applying same. More particularly, this invention relates to a loose-fill/redispersible powder adhesive mixture and a method of applying same together with a liquid (e.g. water) for activating the adhesive in order to create a uniform insulating product.

BACKGROUND OF THE INVENTION

Fiberglass batt installation typically requires the time consuming cutting up or shaping of batts when the need arises to fill abnormally shaped open cavities between studs, or insulate around electric boxes, wires, and the like. Furthermore, structures insulated with batts often suffer from less than desirable thermal and sound insulation due to the void areas sometimes found around the edges of the batts adjacent studs or other supporting structure.

In recent years, a number of loose-fill insulation systems have been developed in an attempt to overcome these disadvantages inherent in residential fiberglass batt usage. In order to get low density loose-fill fiberglass insulation into enclosed vertically extending residential wall (stud bounded) cavities in a practical manner and at a commercially acceptable cost, it has heretofore been known to resort to the BIBS (Blown-In-Blanket™) system disclosed, for example, in U.S. Pat. Nos. 4,712,347 and 5,287,674 to Sperber. Many residential contractors and the like currently use BIBS instead of fiberglass batts for the purpose of improving insulative qualities (both thermal and sound) and application efficiency.

In accordance with BIBS, a supporting structure such as flexible netting (e.g. nylon) or the like is affixed across a plurality of wall studs in order to enclose vertically extending wall stud defined cavities. Thereafter, hole(s) are formed in the netting and a blowing hose is inserted into the hole(s) for the purpose of filling the enclosed wall cavities with blown loose-fill siliconized fiberglass insulation. An exemplary insulation which may be used in conjunction with BIBS is InsulSafe III™ available from CertainTeed Corp., Valley Forge, Pa. This loose-fill fiberglass coated with a hydrophobic agent is said to be able to achieve an R-15 at a density of 2.5 lbs./ft$^3$ when 3.5 inches thick. Perfect Fit™ loose-fill fiberglass available from Guardian Fiberglass, Albion, Mich. is another siliconized loose-fill often used (i.e. approved) in conjunction with BIBS.

In commercial BIBS applications, the loose-fill siliconized fiberglass may be blown using a commercially available Ark-Seal machine which coats the loose-fill with a liquid adhesive as the insulation is blown behind the netting or other (e.g. rigid) retaining structure. Unfortunately, the use of this liquid adhesive results in a number of problems, including: (i) the liquid adhesive often gums up the adhesive jet and/or hose thereby causing application and clean-up inefficiencies and hardships; (ii) storage and transport of the liquid adhesive to job sites are burdensome, costly, and render the liquid adhesive susceptible to freezing—the adhesive is damaged if frozen; (iii) user clean-up of the liquid adhesive equipment (i.e. hose, pump, nozzle, and environment) is time-consuming and cuts into potential production time (in contrast, a simple water system would require little clean-up); (iv) getting the proper adhesive/fiberglass mixture or ratio in the field (i.e. on site) is not as easy as it would seem—users are forced to manually mix the adhesive on site prior to use, this often leading to an improper (too much or too little) LOI (adhesive quantity) in the final blown insulation product which in turn creates a non-uniform application; and finally (v) users at the job site often may not make use of the required adhesive and simply spray water with the fiberglass in an attempt to save both time and money—this leading to a potentially inferior insulation product prone to settling after installation is complete.

U.S. Pat. Nos. 4,710,309 and 4,804,695 also disclose insulation blowing systems where the loose-fill is coated with a liquid adhesive prior to application and during the blowing process. Again, such systems suffer from the problems listed above which are inherent with the use of liquid adhesive.

It will be apparent from the above that there exists a need in the art for eliminating the need for the use of liquid adhesive. To date, no fiberglass product is commercially available for application with spraying/blowing applications which both eliminates the need for the liquid adhesive and provides satisfactory results with respect to uniformity, density, R-value, and LOI (loss-on-ignition).

As will be appreciated, insulation products are properly divided into two distinct categories: organic vs. inorganic. Fiberglass, an inorganic insulation product, has long been the insulation of choice among architects, builders, and contractors because it is non-moisture-absorbing, fire retardant, and provides consistently uniform R-values. In recent years, however, cellulose, an organic insulation product, has come into favor with many builders, particularly because of its cost and its use of natural products such as newspaper, cardboard, etc. (i.e. recyclability). Unfortunately, cellulose and its organic nature are generally viewed by many as undesirable in BIBS and other spray/blow applications for the following reasons: (i) its organic nature renders it attractive to mold, mildew, fungus, rodents, vermin, etc.; (ii) cellulose is penetrated by moisture (moisture does not simply coat the product as with fiberglass) rendering it susceptible to rot, decay, and requiring undesirably long cure times when exposed to liquid spray additives (especially in humid environments); (iii) cellulose often settles to a greater degree in cavities than, for example, fiberglass, thereby decreasing R-values within a filled cavity as time passes; (iv) cellulose is less aesthetically appealing to many users than fiberglass; and (v) cellulose is non-fire-resistant because of its organic nature and therefore requires an added chemical load for flame retardance purposes—this, of course, increasing cost and sometimes creating an unfriendly odor.

For example, U.S. Pat. No. 4,773,960 discloses a cellulose loose-fill insulation system (see also Suncoast's S.A.B.™ System). Dry organic adhesive and cellulose-based insulation are sprayed or blown together with water which activates the adhesive during blowing. As set forth in the '960 patent, "insulation of the cellulose fiber type can be pre-treated with an adhesive which, when moistened, becomes activated and improves the setting properties of the insulation." Unfortunately, such cellulose pre-treated products are organic in nature and suffer from the inherent problems outlined above. Furthermore, the dry adhesive used to "pre-treat" the cellulose in the '960 patent as well as other cellulose systems is starch-based (i.e. organic). An actual adhesive disclosed in the '960 patent is wheat starch. Again, the organic nature of such pre-treating agents renders them susceptible to mold, mildew, fungus, rodents, vermin, etc., especially when in storage along with the cellulose prior to use.

It is also to be pointed out that many prior art fiberglass and cellulose products have high LOI values which leads to increased cost of product. It would satisfy a need in the art if a fiberglass system/product with a low LOI could be provided so as to improve yields while still resulting in uniform applications.

It will be apparent to those of skill in the art that a need exists in the art for a mixture including an inorganic insulation (e.g. fiberglass) and a dry inorganic adhesive for use in fiberglass spray systems which avoids the problems inherent in the pre-treated organic cellulose products discussed above thereby resulting in uniform and efficient product applications.

The term "LOI" (loss-on-ignition) as used herein is defined by ASTM C764-91, incorporated herein by reference. LOI refers to the known method for measuring the binder content of loose-fill mineral fiber insulation.

SUMMARY OF THE INVENTION

Generally speaking, this invention fulfills the above-described needs in the art by providing a dry loose-fill fiberglass insulation mixture adapted to be blown together with an activating liquid into a cavity, the mixture comprising:

loose-fill fiberglass; and an inorganic dry powder adhesive mixed with the loose-fill fiberglass so that when the mixture is coated with the liquid and blown into a cavity, the adhesive is activated.

According to certain preferred embodiments of this invention, the dry adhesive includes vinyl ester of versatic acid terpolymer in the form of a redispersible powder.

This invention further fulfills the above-described needs in the art by providing a system for blowing a fiberglass/dry adhesive mixture into a cavity for purposes of insulation, the system comprising:

a blower for blowing a dry mixture of loose-fill fiberglass and inorganic powder adhesive;

a pump for pumping an activating liquid so that the blown dry fiberglass/adhesive mixture is coated with the liquid, the liquid activating the inorganic adhesive; and means for blowing the coated mixture of loose-fill fiberglass and activated adhesive into a cavity so as to insulate the cavity.

According to certain preferred embodiments of this invention, the means for blowing results in the installed mixture in the cavity having a density of less than or equal to about 2.5 lb.\ft$^3$ and an R-value of at least about 3.15 per inch thickness.

This invention still further fulfills the above-described needs in the art by providing a method of spraying or blowing loose-fill fiberglass insulation into a cavity, the method comprising the steps of:

providing loose-fill fiberglass;

mixing the loose-fill fiberglass together with a dry inorganic adhesive powder to make up a loose-fill mixture;

applying a liquid to the loose-fill mixture in order to activate the adhesive; and spraying or blowing the loose-fill mixture with activated adhesive into the cavity so as to insulate the cavity.

This invention will now be described with respect to certain embodiments thereof, accompanied by certain illustrations wherein:

DETAILED DESCRIPTION OF CERTAIN EMBODIMENTS OF THIS INVENTION

In accordance with this invention, a loose-fill mixture of (i) fiberglass and (ii) an inorganic dry adhesive in the form of a redispersible powder, is blown or sprayed together with an activating liquid (e.g. water) into a cavity (open or closed) to be insulated. The liquid applied to the mixture during blowing/spraying activates the dry adhesive so that when the insulating mixture reaches the cavity it is retained, or sticks, therein as will be described below. In such a manner, it is ensured that the proper adhesive amount is present in the product. Thus, the user needs only to add an activating liquid such as water to the mixture at the job site in order to achieve a premium residential insulation product which yields high R-values and cost-effective densities together with uniform and consistent applications. Additionally, productivity is increased due to the elimination of the need for mixing and clean-up.

Firstly, a dry mixture of loose-fill fiberglass and dry adhesive in the form of a redispersible powder is provided. An exemplary white loose-fill fiberglass which may be used is Perfect Fit™, commercially available from Guardian Fiberglass, Albion, Mich. Perfect Fit™ has a standard cube size and is coated with silicone (or other water-resistant hydrophobic agent) as known in the trade.

The dry latex adhesive which is mixed with the loose-fill fiberglass may be, according to certain embodiments, a vinyl ester copolymer based resin. Such a dry adehsive is available from Air Products, Lehigh Valley, Pa., as AIRFLEX™ RP-238. In a typical formulation, RP-238 is a redispersible powder which shows excellent adhesion, water resistance, and workability. Its solid content is 99±1%, and it utilizes a protective colloid of polyvinyl alcohol. Other redispersible powders having similar properties may also be used.

The non-activated dry adhesive powder (e.g. RP-238) is mixed with the loose-fill fiberglass, preferably at the manufacturing plant, so that the resulting mixture is from about 0.1 to 2.0% by weight dry adhesive, the remaining weight being substantially represented by the fiberglass (and possibly de-dusting and/or anti-static agents). According to certain preferred embodiments, the dry mixture is from about 0.50 to 0.75% by weight adhesive. Thus, the mixture is from about 98 to 99.9%, preferably from about 99.0 to 99.50% by weight loose-fill fiberglass.

Figure 1:
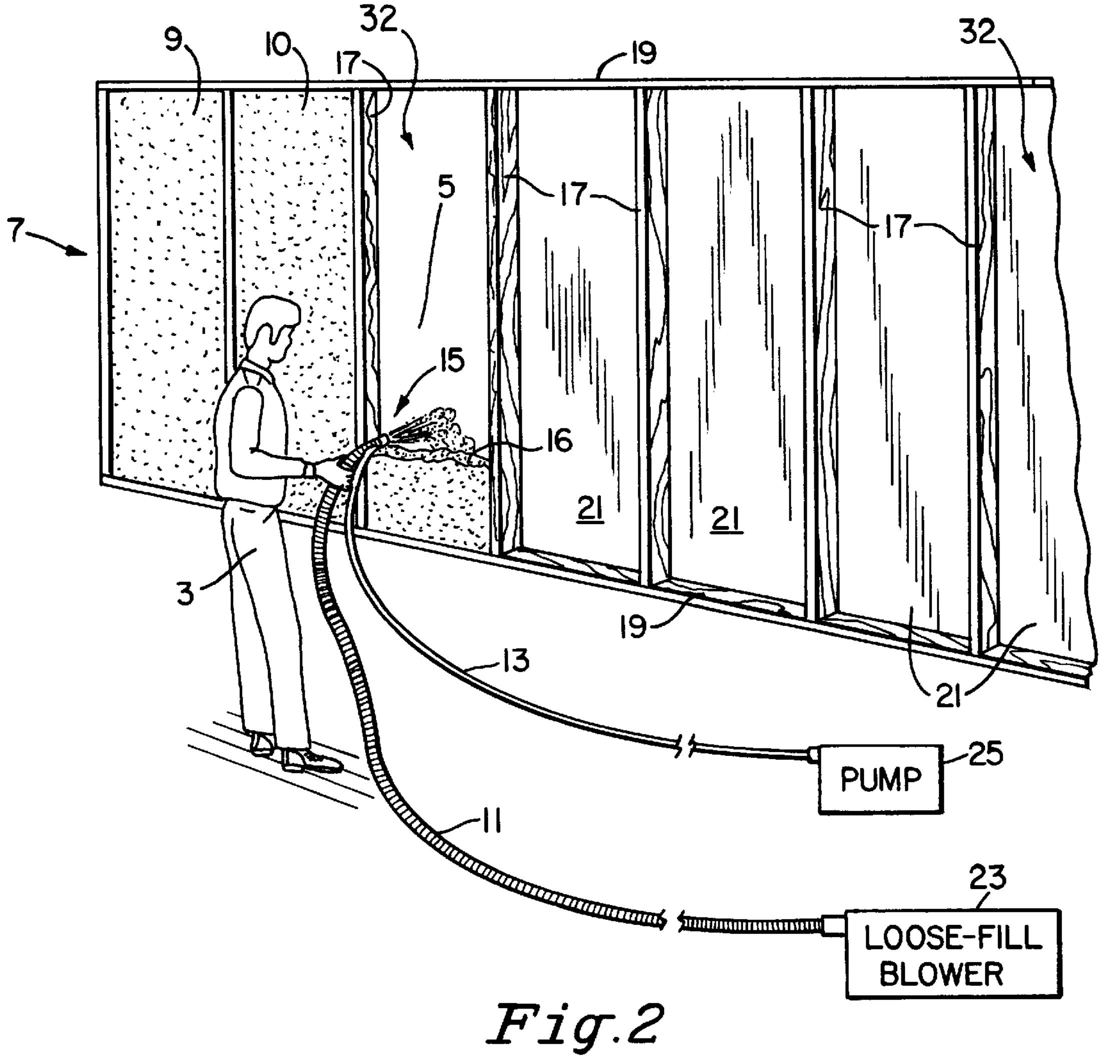
FIG. 1 is a perspective view of a user blowing/spraying a loose-fill fiberglass/dry adhesive mixture coated with an activating liquid such as water into a vertically extending open wall cavity according to an embodiment of this invention.
Figure 2:
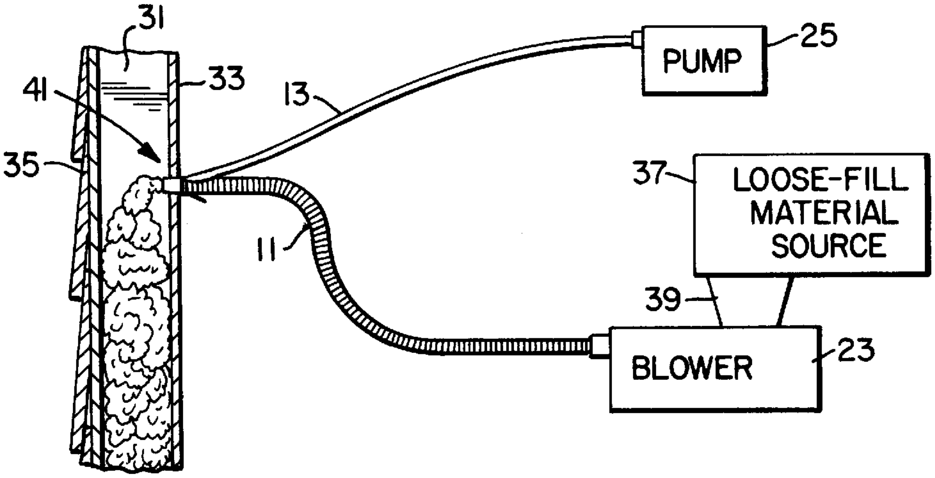
FIG. 2 is a perspective view of a user blowing/spraying a loose-fill fiberglass/dry adhesive mixture coated with activating liquid into a vertically extending cavity closed with a supporting structure according to another embodiment of this invention.

The fiberglass loose-fill/dry adhesive mixture may be sprayed or blown into both enclosed and open cavities according to different embodiments of this invention following activation of the adhesive. FIG. 1 is a perspective view of the mixture being wetted with an activating liquid (e.g. water) and thereafter blown into a vertically extending open cavity, while FIG. 2 is a perspective view of the mixture being wetted and thereafter blown into an enclosed cavity (e.g. in accordance with systems where a rigid structure encloses the cavity so as to retain the insulation therein).

As shown in FIG. 1, user 3 is provided with dry mixture blow hose 11 and activating liquid supply hose 13. At nozzle area 15, the loose-fill/dry adhesive mixture blown from hose 11 is coated or wetted with the activating liquid (e.g. water) from hose 13 and thereafter sprayed/blown into open cavity 5. Alternatively, hoses 11 and 13 may be combined at an earlier stage so that user 3 is provided with only one hose nozzle to grip. In either case, the dry adhesive in the mixture supplied through hose 11 is activated when wetted with the liquid from hose 13. After activation of the adhesive, the wet mixture is blown into the cavity. As shown in FIG. 1, the sprayed insulation mixture with activated adhesive adheres to or sticks to wall 32 which may be made of plywood, Celotex™, or any other known residential exterior insulating sheeting. No netting or other supporting structure is needed to retain the sprayed on mixture in open cavity 5 as shown in FIG. 1.

Each cavity is bounded on either side by vertical studs 17 and on the top and bottom by horizontal studs 19. These studs may be, for example, 2"×4" as known in the trade. Open cavities 9 and 10 in FIG. 1 have been filled with the spray-on insulation while open cavities 21 have not (open cavity 5 is in the process of being filled).

Dry loose-fill blower 23 is attached to hose 11 and may be, for example, a commercially available pneumatic blower which works in conjunction with liquid pump 25 capable of about 200 psi (although about 100 psi, for example, may be used during application of the product). Blower 23 functions to blow the loose-fill inorganic mixture through hose 11 to nozzle area 15 where the adhesive is activated by the liquid from hose 13. The liquid is pumped through hose 13 by way of pump 25 as discussed above. The liquid from hose 13 coats the fiberglass and activates the adhesive, and also acts to retain the dampened mixture in cavity 5 during spraying, while the activated adhesive functions to hold the fiber in cavity 5 after curing and provides desirable integrity.

Blow hose 11 and liquid hose 13 may be from about 50 to 150 ft. long. According to preferred embodiments, the hoses are about 150 ft. long and hose 11 has a 3 inch diameter. Liquid hose 13 may be, for example, a one-quarter inch diameter high pressure hose as will be appreciated by those of skill in the art.

With respect to the hose tips adjacent nozzle area 15, the spray head is defined by a circular metal chamber (not shown) having a one-quarter inch supply line with a control valve and quick connect coupling fitted over a machined nozzle inserted into the discharge end of hose 11 in order to apply the activating liquid (e.g. water) from hose 13 to the dry mixture as it exits the discharge end of hose 11 at the spray head. Spray jets, not shown, (e.g. H1/8VV1501 or H1/8VV2501 commercially available from Spraying Systems, Wheaton, Ill.) are threaded into the face of the spray head in order to atomize and direct the liquid from the discharge end of hose 13 onto the dry mixture before application. It has been found by the instant inventors that during spray-on applications into vertically extending open cavities as shown in FIG. 1, the fiberglass mixture adheres better within the cavity when the fiberglass is substantially free of silicone (or other similar hydrophobic agent). Thus, substantially non-siliconized loose-fill fiberglass is mixed with the dry adhesive in spray-on applications as shown in FIG. 1.

FIG. 2 illustrates perspectively an insulation application system and cross-sectionally a vertically extending enclosed cavity 31. Cavity 31 is bounded by studs laterally and by retaining rigid structure 33 and exterior sheeting 35 on the remaining sides. Blower 23 and liquid pump 25 as well as the hoses in the FIG. 2 embodiment are as in the FIG. 1 embodiment. Additionally, loose-fill material source 37 (e.g. hopper) is shown in FIG. 2 as being in communication with blower 23 via chute 39.

A significant difference between the FIG. 1 and FIG. 2 embodiments is that in FIG. 1, open cavities are being insulated while in FIG. 2 enclosed cavities are being insulated. As shown in FIG. 2, a plurality of holes or apertures 41 are defined in rigid structure or wall 33 thereby allowing the nozzle area of hoses 11 and 13 to be inserted into cavity 31. In such a manner, the dampened insulation with activated adhesive is blown directly into the cavity with structure 33 functioning to hold the insulation in place until the adhesive cures.

It has been found by the instant inventors that conventional siliconized (other hydrophobic agents may also be used) loose-fill mixed with the dry adhesive redispersible powder functions well in closed cavity applications as shown in FIG. 2.

It has been found by the instant inventors that the use of the dry fiberglass/adhesive mixture in both open cavity (FIG. 1) and closed cavity applications (FIG. 2) results in more uniform and consistent applications, as well as increased productivity potential relative to the prior art fiberglass systems discussed above.

This invention will now be described with respect to certain examples as follows.

EXAMPLES 1–4

The dry fiberglass/powder mixtures according to Examples 1–4 are set forth below in Chart 1, each element being represented by its percentage in weight relative to the overall mixture. For these Examples, the dry redispersible powder used was RP-238 while the loose-fill fiberglass was conventional white loose-fill coated with silicone available from Guardian Fiberglass, Albion, Mich. The de-dusting oil and anti-static agent in the mixtures were both conventional.

CHART 1

| Dry Mixture Example No. | % Fiberglass by weight | % De-dusting oil and anti-static agent | % RP-238 dry adhesive by weight |
|---|---|---|---|
| 1 | 99.15% | 0.20% | 0.65% |
| 2 | 99.10% | 0.20% | 0.70% |
| 3 | 99.05% | 0.20% | 0.75% |
| 4 | 98.6% | 0.20% | 1.2% |

EXAMPLES 5–7

While Examples 1–4 set forth above in Chart 1 represent the make-up of four different dry mixtures, Examples 5–7 describe the spray-on application of a dry mixture made up of 0.20% de-dusting/anti-static, 1.10% RP-238 dry adhesive, and 98.7% by weight white loose-fill fiberglass (with no hydrophobic agent). The insulation products of Examples 5–7 were applied as shown in FIG. 1. Commercially available neumatic blowing machine 23 was used to apply the dry mixture including the adhesive, blower 23 being initially set to run at about 1950–1980 RPM. Pump 25 and hose 13 were used to supply water to nozzle area 15 so that the dry mixture exiting hose 11 was coated with water (in order to activate the adhesive) before spraying into cavity 5. Four jets (H1/8VV1501 at 100 PSI) were used at nozzle area 15 adjusted to the twelve o'clock and six o'clock positions as known in the trade with a flat spray projectory being set in the horizontal position of each jet.

User 3 stood on the ground approximately five to six feet from wall structure 7. Rear wall 32 was made of plywood. The user turned on blower 23 and then immediately turned on the flow valve for water hose 13. The loose-fill fiberglass/dry adhesive mixture discharged from the nozzle end of hose 11 was coated with water from hose 13 in order to activate the adhesive and thereafter sprayed or blown into cavity 5 where it was retained as shown in FIG. 1. User 3 manipulated the spray nozzle in a side to side or back and forth manner building shelf upon shelf 16 of insulation starting at the bottom of cavity 5 near the lower horizontal stud 19 and proceeded upward as the cavity was filled. All studs were 2"×4" and made of wood. Cavity 5 was filled to an insulation thickness of about 1" beyond (or exterior) the most outward protrusion of vertical studs 17 (i.e. the insulation was applied to a thickness of about 4.5 to 5.0 inches originally).

Immediately after spraying the dampened mixture into cavity 5, the installed fiberglass product was compression rolled using a non-stick roller (not shown) so as to pack the insulation within the cavity to a thickness of about 3.5 inches substantially flush with the exterior faces of studs 17. After rolling, if and when gaps or voids in the insulation finally became observed or evident, residual or overspray fiberglass which had fallen to the floor was placed and packed in the cavity to fill such voids.

The front faces of studs 17 and 19 were then cleaned so that wallboard could be applied in order to close cavity 5. The user then allowed the installed fiberglass to cure (i.e. dry). Curing at this 3.5 inch thickness took about twenty-four hours after which the applied LOI data was taken.

The procedures and steps set forth above were carried out numerous times (the temperature was ambient atmopshere) resulting in the three Examples set forth in Chart 2 below for Examples 5–7.

CHART 2

| Example No. | Density (lb.\ft$^3$) | R-Value at 3.5" thickness | Applied LOI % |
|---|---|---|---|
| 5 | 2.5 | 13.4 | 1.38% |
| 6 | 2.27 | 11.9 | 1.36% |
| 7 | 2.00 | 13.0 | 1.36% |

The density data in pounds per cubic foot (lb.\ft$^3$) taken and set forth in Chart 2 illustrates that the density of the installed and cured insulation product was less than or equal to about 2.5 lb.\ft$^3$, more preferably less than or equal to about 2.0 lb.\ft$^3$ according to certain embodiments of this invention, while the R-value was greater than about 11, more preferably greater than about 12, and most preferably greater than about 13 given an insulation thickness of about 3.5 inches. This translates into R-values of at least about 3.15 per inch thickness, 3.43 per inch thickness, and 3.71 per inch thickness respectively.

With respect to the applied LOI data set forth in Chart 2, this is indicative of the binder content of the final product resulting from the RP-238 dry adhesive powder as activated by the water. In other words, the applied LOI shown in Chart 2 is not an indication of the dedusting oil and anti-static agent contents. The applied LOI percent is generally less than about 2.0% according to certain embodiments of this invention, and more preferably less than about 1.50% and most preferably less than about 1.38%.

Once given the above disclosure, many other features, modifications, and improvements will become apparent to the skilled artisan. Such other features, modifications, and improvements are therefore considered to be a part of this invention, the scope of which is to be determined by the following claims.

We claim:

1. A fiberglass insulation mixture capable of rapidly forming a dimensionally stable insulation structure when blown into an open cavity, said mixture consisting essentially of:

about 98%–99.9% by weight dry loose fill fiberglass in a form capable of being blown into an open cavity; and about 0.1%–2.0% by weight dry, liquid activatable polymeric redispersible powder resin adhesive dispersed throughout said dry loose fill fiberglass;

said amount of said adhesive powder and said amount of said dry loose fill fiberglass in combination, being such that when said mixture is admixed with an activating liquid said mixture will form a dimensionally stable insulation structure sufficiently rapidly to be capable of being blown into an open cavity to fill said open cavity with said dimensionally stable insulation structure.

2. A fiberglass insulation mixture according to claim 1 wherein said adhesive comprises a vinyl ester of versatic acid terpolymer.

3. A fiberglass insulation mixture according to claim 1 wherein said dimensionally stable insulation structure has a density of $\leqq$2.5 lb./ft.$^3$ and an R-value of at least 3.15 per inch thickness.

4. A fiberglass insulation mixture according to claims 1, 2, 3 wherein said open cavity is a part of a vertical wall.

* * * * *

UNITED STATES PATENT AND TRADEMARK OFFICE

CERTIFICATE OF CORRECTION

PATENT NO. : 5,952,418

DATED : Sep. 14, 1999

INVENTOR(S) : Gary E. Romes, Mark H. Vagedes, Joseph T. Church and Charles Chenoweth It is certified that error appears in the above-identified patent and that said Letters Patent is hereby corrected as shown below:

Column 1, line 58, delete "Ark-Seal" after "available" and substitute --ArkSeal--.

Column 6, line 65, delete "neumatic" after "available" and substitute --pneumatic--.

Column 8, line 53, claim 4, insert --or-- before "3".

Signed and Sealed this

Eleventh Day of April, 2000

Attest:

Q. TODD DICKINSON

Attesting Officer

*Director of Patents and Trademarks*